United States Patent
Yu (10) Patent No.: US 11,431,669 B2
(45) Date of Patent: Aug. 30, 2022

(54) SERVER CONFIGURATION METHOD AND APPARATUS

(71) Applicant: Alibaba Group Holding Limited, Grand Cayman (KY)

(72) Inventor: Zhiwen Yu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/079,231

(22) Filed: Oct. 23, 2020

(65) Prior Publication Data

US 2021/0044562 A1 Feb. 11, 2021

Related U.S. Application Data

(63) Continuation of application No. PCT/CN2019/083423, filed on Apr. 19, 2019.

(30) Foreign Application Priority Data

Apr. 25, 2018 (CN) .......................... 201810377843.1

(51) Int. Cl.
*H04L 41/069* (2022.01)
*H04L 41/0803* (2022.01)
(Continued)

(52) U.S. Cl.
CPC ........ *H04L 61/1511* (2013.01); *H04L 41/069* (2013.01); *H04L 41/0803* (2013.01); *H04L 67/1002* (2013.01); *H04L 67/2842* (2013.01)

(58) Field of Classification Search
None
See application file for complete search history.

(56) References Cited

U.S. PATENT DOCUMENTS 7,584,281 B2  9/2009 Bernardin et al.
7,761,538 B2  7/2010 Lin et al.
(Continued)

FOREIGN PATENT DOCUMENTS

CN   102523231 A   6/2012
CN   104320487 A   1/2015
(Continued)

OTHER PUBLICATIONS

Translation of International Search Report for corresponding PCT Application No. PCT/CN2019/083423 dated Jun. 27, 2019, a counterpart foreign application for U.S. Appl. No. 17/079,231, 2 pages.
(Continued)

*Primary Examiner* — Joshua Joo
(74) *Attorney, Agent, or Firm* — Lee & Hayes, P.C.

(57) ABSTRACT

A method including performing data mining according to a first domain name bandwidth and a local buffer hit ratio of a server, so as to obtain a threshold corresponding to the first domain name bandwidth; according to the threshold and the size of a second domain name bandwidth, obtaining the number of servers to be allocated. The present disclosure solves the technical problem in the conventional techniques that the configuration of the number of servers for a domain name in a region needs to be adjusted on the basis of experiences or manually in real time according to actual situations, resulting in high operation and maintenance costs and unguaranteed configuration accuracy.

20 Claims, 6 Drawing Sheets

(51) Int. Cl.
  *H04L 67/568* (2022.01)
  *H04L 61/4511* (2022.01)
  *H04L 67/1001* (2022.01)

(56) References Cited

U.S. PATENT DOCUMENTS

| | | | |
|---|---|---|---|
| 8,195,337 B2 | 6/2012 | McCarthy et al. | |
| 8,364,785 B2 | 1/2013 | Plamondon | |
| 8,694,642 B2 | 4/2014 | Dempsky et al. | |
| 9,354,989 B1* | 5/2016 | Sehgal | G06F 11/3034 |
| 9,372,825 B1* | 6/2016 | Shee | H04L 67/1097 |
| 9,596,299 B2 | 3/2017 | Yengalasetti et al. | |
| 9,870,428 B2 | 1/2018 | Jellick | |
| 10,560,339 B2 | 2/2020 | McPherson | |
| 10,608,983 B2 | 3/2020 | Prince et al. | |
| 11,025,710 B1* | 6/2021 | Zarifis | H04L 67/1008 |
| 2005/0138165 A1* | 6/2005 | Tang | H04N 21/2181 |
| | | | 709/224 |
| 2005/0144317 A1* | 6/2005 | Chase | H04L 67/327 |
| | | | 709/238 |
| 2009/0222562 A1* | 9/2009 | Liu | H04L 67/1002 |
| | | | 709/226 |
| 2014/0258631 A1* | 9/2014 | Cudak | G06F 12/084 |
| | | | 711/130 |
| 2015/0074222 A1* | 3/2015 | Liang | H04L 67/288 |
| | | | 709/214 |
| 2016/0019094 A1* | 1/2016 | Habdank | G06F 9/5083 |
| | | | 718/104 |
| 2017/0085674 A1 | 3/2017 | Carney et al. | |
| 2018/0034929 A1* | 2/2018 | Reeser | H04L 69/28 |
| 2019/0034806 A1* | 1/2019 | Periorellis | G06F 11/3006 |
| 2020/0117601 A1* | 4/2020 | Kaneda | G06F 3/06 |

FOREIGN PATENT DOCUMENTS

| | | |
|---|---|---|
| CN | 105872029 A | 8/2016 |
| CN | 106027642 A | 10/2016 |
| CN | 106034083 A | 10/2016 |
| CN | 106921713 A | 7/2017 |
| CN | 107172126 A | 9/2017 |
| WO | WO2016074323 A1 | 5/2016 |

OTHER PUBLICATIONS

Translation of Written Opinion for corresponding PCT Application No. PCT/CN2019/083423 dated Jun. 27, 2019, a counterpart foreign application for U.S. Appl. No. 17/079,231, 3 pages.
Machine translated first office action in Chinese patent application No. 201810377843.1, dated Sep. 27, 2021, 9 pages.
The CN Search Report dated Sep. 22, 2021 for CN application No. 201810377843.1, 1 page.
The Extended European Search Report dated Dec. 22, 2021 for European Patent Application No. 19793601.6, 10 pages.
Gummadi et al., "Measurement, Modeling, and Analysis of a Peer-to-Peer File-Sharing Workload," ACM SOSP. Proceedings of the ACM Symposium on Operating Syestems Priniciples, Oct. 19, 2003, pp. 314-329.
Jagruti et al, "A Survey on Replica Server Placement Algorithms for Content Delivery Networks," IEEE Communications Surveys & Tutorials, vol. 19, No. 2, Nov. 9, 2016, pp. 1002-1026.
Rao et al, "Optimal proactive caching in peer-to-peer network," Proceedings of the ACM Sixteenth Conference on Information and Knowledge Management, Nov. 6-9, 2007, pp. 663-672.
Zhang et al, "Dynamic Service Placement in Geographically Distributed Clouds," IEEE Journal on Selected Areas in Communications, vol. 31, No. 12, Dec. 31, 2013, pp. 762-772.

* cited by examiner

FIG. 1

```
┌─────────────────────────────────────────────────────────────┐
│ PERFORM DATA MINING ACCORDING TO FIRST DOMAIN NAME BANDWIDTH │
│ AND LOCAL BUFFER HIT RATIO OF SERVER, SO AS TO OBTAIN THRESHOLD │
│      CORRESPOND TO FIRST DOMAIN NAME BANDWIDTH              │
│                         S202                                │
└─────────────────────────────────────────────────────────────┘
                              │
                              ▼
┌─────────────────────────────────────────────────────────────┐
│    ACCORDING TO THRESHOLD AND SIZE OF SECOND DOMAIN NAME    │
│    BANDWIDTH, OBTAIN NUMBER OF SERVERS TO BE ALLOCATED      │
│                         S204                                │
└─────────────────────────────────────────────────────────────┘
```

SERVER CONFIGURATION METHOD AND APPARATUS

CROSS REFERENCE TO RELATED APPLICATIONS

This application claims priority to and is a continuation of PCT Patent Application No. PCT/CN2019/083423, filed on 19 Apr. 2019 and entitled "Server Configuration Method and Apparatus," which claims priority to Chinese Patent Application No. 201810377843.1, filed on 25 Apr. 2018 and entitled "Server Configuration Method and Apparatus," which are incorporated herein by reference in their entirety.

TECHNICAL FIELD

The present disclosure relates to the field of Internet technology application, and, more particularly, to a server configuration method and apparatus.

BACKGROUND

During traffic scheduling of the content delivery network (CDN), in order to prevent a single machine fault from affecting too many users, the traffic is typically scattered to a plurality of servers. The number of servers used for a domain name in a region may be randomly assigned by the scheduling system, while the operation and maintenance personnel take manual scheduling measures to avoid problems when they find the service quality is poor. Alternatively, the number of servers used for a domain name in a region may be subject to the domain name configuration file or the default value of the scheduling system, and after the service changes, the operation and maintenance personnel need to modify the configuration content accordingly.

Here, if there are too few servers, the access speed will be slow. But having more servers does not mean better speed. In the CDN system, typically it is preferred to store the accessed domain name in a cache, so that the customer directly invokes the cache during accessing and the speed is the highest; if the accessed domain name is not stored in a cache, it is necessary to recursively request for a domain name from the upper Domain Name System (DNS), but the access speed will become slower.

In conventional techniques, the number of servers configured for a domain name in a region is typically assigned randomly or based on configuration which needs to be adjusted on the basis of experiences or manually in real time according to actual situations, resulting in high operation and maintenance costs and unguaranteed configuration accuracy.

With respect to the foregoing problem that the configuration of the number of servers for a domain name in a region needs to be adjusted on the basis of experiences or manually in real time according to actual situations, resulting in high operation and maintenance costs and unguaranteed configuration accuracy, no effective solution has been proposed yet.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An embodiment of the present disclosure provides a server configuration method and apparatus to at least solve the technical problem in the conventional techniques that the configuration of the number of servers for a domain name in a region needs to be adjusted on the basis of experiences or manually in real time according to actual situations, resulting in high operation and maintenance costs and unguaranteed configuration accuracy.

According to an embodiment of the present disclosure, a server configuration method is provided, comprising: performing data mining according to a first domain name bandwidth and a local buffer hit ratio of a server, so as to obtain a threshold corresponding to the first domain name bandwidth; and according to the threshold and the size of a second domain name bandwidth, obtaining the number of servers to be allocated.

For example, after obtaining the number of servers to be allocated, the method further comprises: adjusting the first domain name bandwidth on a server cluster according to a preset ratio; and obtaining an adjusted threshold according to the adjusted first domain name bandwidth and the state change of the local buffer hit ratio of the server, so as to obtain the number of servers to be allocated according to the adjusted threshold.

For example, performing data mining according to a first domain name bandwidth and a local buffer hit ratio of a server, so as to obtain a threshold corresponding to the first domain name bandwidth comprises: obtaining a first domain name bandwidth of any domain name from a user access log and obtaining a local buffer hit ratio of a server; and determining a threshold according to the correspondence between the value change of the first domain name bandwidth and the state change of the local buffer hit ratio of the server.

Further, for example, obtaining a first domain name bandwidth of any domain name from a user access log and obtaining a local buffer hit ratio of a server comprises: according to a preset cycle, obtaining a first domain name bandwidth of any domain name from a user access log and obtaining a local buffer hit ratio of a server.

For example, determining a threshold according to the correspondence between the value change of the first domain name bandwidth and the state change of the local buffer hit ratio of the server comprises: according to the value change of the first domain name bandwidth and the state change of the local buffer hit ratio of the server, determining a specific value at which the local buffer hit ratio of the server no longer rises or rises within a preset margin, such as a margin smaller than a margin threshold, as a threshold under the condition that the value of the first domain name bandwidth is the specific value.

For example, according to the threshold and the size of a second domain name bandwidth, obtaining the number of servers to be allocated comprises: obtaining the current number of servers to be allocated according to the current domain name bandwidth and the threshold under the condition that the second domain name bandwidth includes the current domain name bandwidth. The current domain name bandwidth is obtained in real time by a traffic acquisition device. For example, the current domain name bandwidth is the first domain name bandwidth.

Further, for example, obtaining the current number of servers to be allocated according to the current domain name bandwidth and the threshold comprises: obtaining the current number of servers to be allocated by dividing the current domain name bandwidth by the threshold.

For example, according to the threshold and the size of a second domain name bandwidth, obtaining the number of servers to be allocated comprises: under the condition that the second domain name bandwidth comprises a predicted value of domain name bandwidth, obtaining a predicted number of servers to be allocated according to the predicted value of domain name bandwidth and the threshold.

Further, for example, obtaining a predicted number of servers to be allocated according to the predicted value of domain name bandwidth and the threshold comprises: obtaining the predicted number of servers to be allocated by dividing the predicted value of domain name bandwidth by the threshold.

For example, the first domain name bandwidth includes: a server bandwidth; and the second domain name bandwidth includes: a bandwidth purchased from a supplier.

For example, adjusting the first domain name bandwidth on a server cluster according to a preset ratio comprises: scaling up or down the first domain name bandwidth on the server cluster according to the preset ratio.

Further, for example, the server cluster comprises at least one server.

According to an embodiment of the present disclosure, a server configuration apparatus is further provided, comprising: an obtaining module, for performing data mining according to a first domain name bandwidth and a local buffer hit ratio of a server, so as to obtain a threshold corresponding to the first domain name bandwidth; and a first configuration module, for according to the threshold and the size of a second domain name bandwidth, obtaining the number of servers to be allocated.

For example, the server configuration apparatus further comprises: an adjusting module, for adjusting the first domain name bandwidth on a server cluster according to a preset ratio after the number of servers to be allocated is obtained; and a second configuration module, for obtaining an adjusted threshold according to the adjusted first domain name bandwidth and the state change of the local buffer hit ratio of the server, so as to obtain the number of servers to be allocated according to the adjusted threshold.

According to an embodiment of the present disclosure, a storage medium is further provided, which includes a stored program, and during operation, the program controls the device where the storage medium is located to execute: performing data mining according to a first domain name bandwidth and a local buffer hit ratio of a server, so as to obtain a threshold corresponding to the first domain name bandwidth; and according to the threshold and the size of a second domain name bandwidth, obtaining the number of servers to be allocated.

According to an embodiment of the present disclosure, a processor is further provided, which is used to run a program, and during operation of the program, the processor executes: performing data mining according to a first domain name bandwidth and a local buffer hit ratio of a server, so as to obtain a threshold corresponding to the first domain name bandwidth; and according to the threshold and the size of a second domain name bandwidth, obtaining the number of servers to be allocated.

In an embodiment of the present disclosure, a threshold is obtained based on the relationship between a domain name bandwidth and a local buffer hit ratio of a server, and data mining is performed according to a first domain name bandwidth and the local buffer hit ratio of the server, so as to obtain a threshold corresponding to the first domain name bandwidth; and according to the threshold and the size of a second domain name bandwidth, the number of servers to be allocated is obtained to achieve the purpose of alleviating the pressure of manual operation and maintenance, so as to achieve a technical effect of raising configuration accuracy, thereby solving the technical problem in the conventional techniques that the configuration of the number of servers for a domain name in a region needs to be adjusted on the basis of experiences or manually in real time according to actual situations, resulting in high operation and maintenance costs and unguaranteed configuration accuracy.

BRIEF DESCRIPTION OF DRAWINGS

The drawings described herein are intended to provide further understanding of the present disclosure and constitute a part of the present disclosure, and the example embodiments of the present disclosure and their descriptions are intended to explain the present disclosure and not to improperly limit the present disclosure. In the drawings.

DETAILED DESCRIPTION

In order that those skilled in the art have better understanding on the solutions of the present disclosure, the technical solutions in embodiments of the present disclosure will now be clearly and completely described by referring to the accompanying drawings in the embodiments of the present disclosure. Obviously, the described embodiments are only some and not all of the embodiments of the present disclosure. Based on the embodiments in the present disclosure, all other embodiments obtained by those of ordinary skill in the art without creative work shall fall within the scope of the present disclosure.

It should be noted that terms like "first" and "second" in the description and claims of the present disclosure as well as the foregoing drawings are used to differentiate similar objects and are not necessarily for describing a specific sequence or a precedence order. It should be understood that the data used in this way may be interchanged under appropriate circumstances, so that the embodiments of the present disclosure described herein may be implemented in an order other than those illustrated or described herein. Further, the terms "comprise," "provide with" and any variations thereof are intended to cover non-exclusive inclusion, for example, a process, method, system, product or equipment that comprises a series of steps or units is not limited to those clearly listed steps or units and may include other steps or units that are not explicitly listed or are inherent to the process, method, product, or equipment.

According to an embodiment of the present disclosure, a method embodiment for server configuration is further provided. It needs to be noted that the steps shown in the flow chart of the drawings may be executed in a computer system such as a group of computer-executable instructions. A logic sequence is shown in the flow chart, but in some cases, the shown or described steps may be executed in a sequence different from this sequence.

Figure 1:
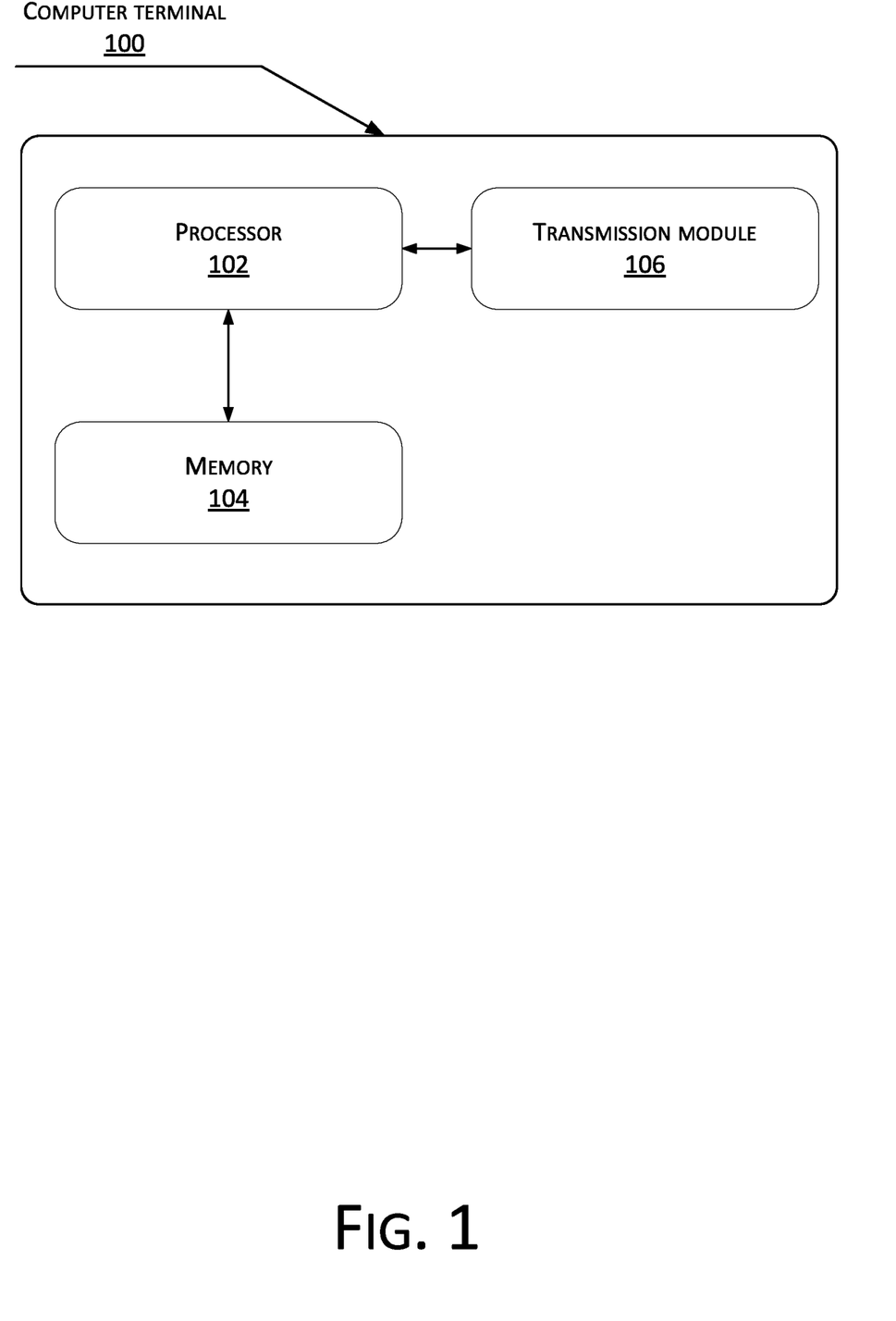
FIG. 1 is a block diagram of hardware structure of a computer terminal in a server configuration method according to an embodiment of the present disclosure.

The method embodiment provided by an embodiment of the present disclosure may be executed in a mobile terminal, a computer terminal or a similar computing device. Taking operation in a computer terminal for example, FIG. 1 is a block diagram of hardware structure of a computer terminal in a server configuration method according to an embodiment of the present disclosure. As shown in FIG. 1, the computer terminal 100 may comprise one or more (only one is shown in the figure) processors 102 (the processors 102 may include without limitation microprocessors MCU or programmable logic devices FPGA and other processing devices), a memory 104 for storing data and a transmission module 106 for communication function. Those of ordinary skill in the art may understand that the structure shown in FIG. 1 is example only and does not limit the structure of the foregoing electronic device. For example, the computer terminal 100 may also comprise more or fewer components than those shown in FIG. 1 or have a configuration different from that shown in FIG. 1.

The memory 104 may be used to store software programs of application software and modules, such as the program instructions/modules corresponding to the server configuration method in an embodiment of the present disclosure. The processor 102 runs the software programs and modules stored in the memory 104 to execute various function applications and data processing, i.e., to achieve a server configuration method of the foregoing application program. The memory 104 may include a high speed random memory, or a nonvolatile memory, such as one or more magnetic storage devices, flash memories, or other nonvolatile solid state memories. In some examples, the memory 104 may further comprise memories remotely arranged relative to the processor 102. These remote memories may be connected to the computer terminal 100 by means of a network. Examples of the foregoing network include but are not limited to Internet, Intranet, local area network (LAN), mobile communication network and combinations thereof.

The transmission device 106 is used to receive or send data via a network. A specific example of the foregoing network may include a wireless network provided by the communication supplier of the computer terminal 100. In an example, the transmission device 106 comprises a network adapter (Network Interface Controller, NIC), which may be connected to other network devices by means of a base station, so that it may communicate with the Internet. In an example, the transmission device 106 may be a Radio Frequency (RF) module, which is used to communicate with the Internet in a wireless manner.

Figure 2:
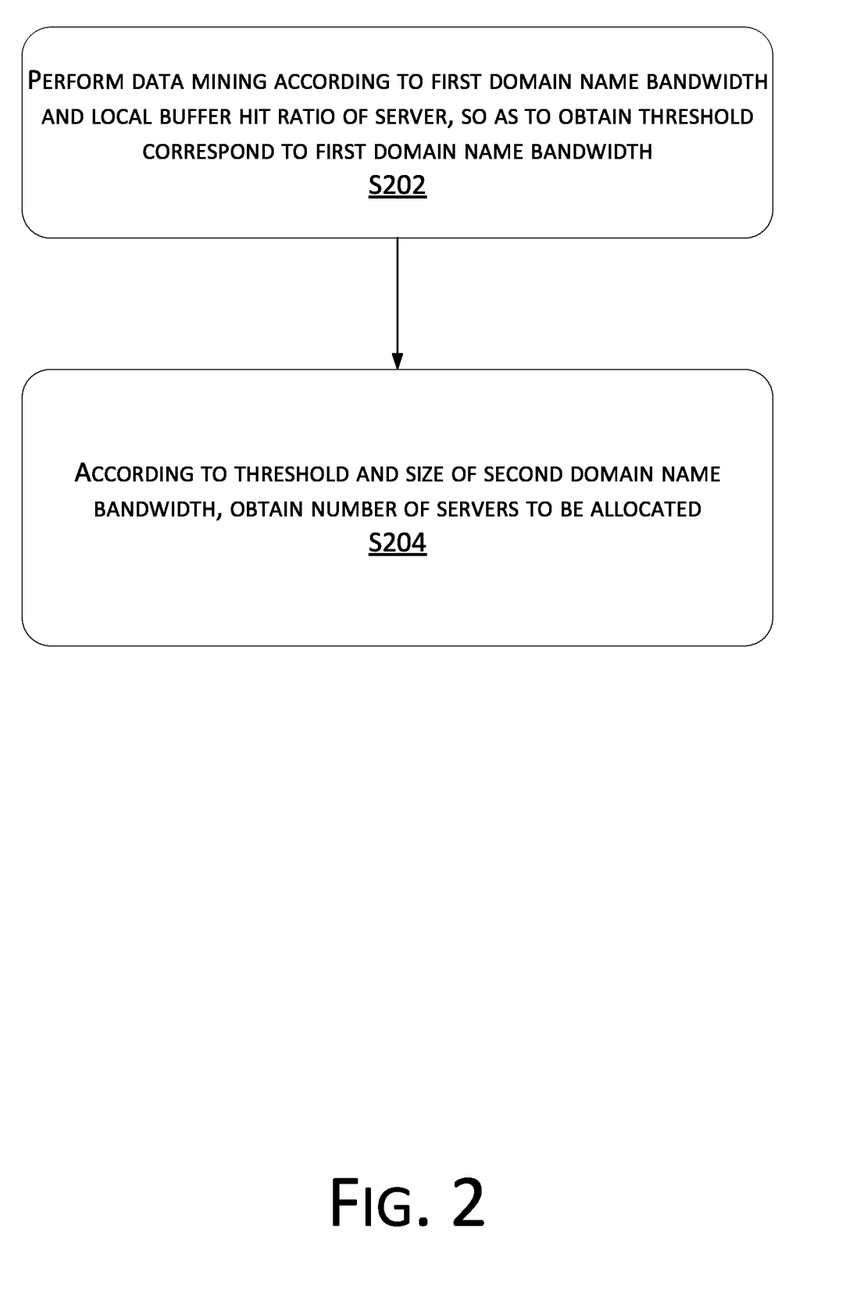
FIG. 2 is a flow chart of a server configuration method according to an embodiment of the present disclosure.

In the foregoing operating environment, the present disclosure provides a server configuration method as shown in FIG. 2. FIG. 2 is a flow chart of a server configuration method according to an embodiment of the present disclosure. For example, the server configuration method provided by the present disclosure is as follows:

Step S202, performing data mining according to a first domain name bandwidth and a local buffer hit ratio of a server, so as to obtain a threshold corresponding to the first domain name bandwidth;

At the foregoing step S202 of the present disclosure, based on CDN, it is for avoiding the technical problem in the conventional techniques that the configuration of the number of servers for a domain name in a region needs to be adjusted on the basis of experiences or manually in real time according to actual situations, resulting in high operation and maintenance costs and unguaranteed configuration accuracy;

The server configuration method provided by the present disclosure obtains the size of domain name bandwidth of any domain name from a user access log (i.e., a first domain name bandwidth provided by the present disclosure, which comprises: a server bandwidth), and a local buffer hit ratio of a server, and obtains a threshold according to the relationship between the size of the first domain name bandwidth of this domain name and the local buffer hit ratio of the server. Here, a principle for obtaining the threshold is as follows: after the first domain name bandwidth is greater than the threshold, the local buffer hit ratio of the server no longer rises or rises within a preset margin, such as a margin smaller than a margin threshold; the threshold may be obtained according to this principle.

The reason that the local buffer hit ratio of the server no longer rises or rises within a preset margin, such as a margin smaller than a margin threshold, is that, taking a user accessing a file for example, if the probability that a user accesses a file is n %, after the number of users reaches a certain level, a file will exist in the cache with a high probability. Therefore, when the number of users reaches a certain level, it is reflected in the domain name bandwidth as a threshold. After the file exists in the cache with a high probability, the local buffer hit ratio of the server will no longer increase, that is, the increase in access will "dilute" the local cache "non-hit ratio" of the server.

Here, the thresholds vary with domain names. For example, the thresholds for non-popular websites and popular websites are different, and the thresholds for portal websites and video websites are also different. As an example, for webpage and image services, the reference single machine bandwidth threshold is 20 M, while for live and on-demand services, the reference single machine bandwidth threshold is 50 M.

Step S204, according to the threshold and the size of a second domain name bandwidth, obtaining the number of servers to be allocated;

At the foregoing step S204 of the present disclosure, based on the threshold and the size of a second domain name bandwidth obtained at step S202 (the second domain name bandwidth in the present disclosure may include: a bandwidth purchased from a supplier), according to the mathematical relation between the second domain name bandwidth and the threshold, a corresponding number of servers to be allocated may be obtained, i.e., the number of servers to be allocated provided by the present disclosure.

Here, the second domain name bandwidth may be understood as the bandwidth purchased from a supplier, for example, video website A purchases 10 G bandwidth from CDN supplier B.

Here, the mathematical relation may include: the number of servers to be allocated=second domain name bandwidth/threshold;

According to the mathematical relation, the number of servers to be allocated may be obtained. The server configuration method provided by the present disclosure aims to quantify the relationship between domain name bandwidth and number of servers during CDN traffic scheduling. For example, if a portal website has 10 G bandwidth, then the method will calculate the number of servers needed in order to achieve the optimum effect, make the traffic neither too scattered, affecting the local buffer hit ratio nor too concentrated, affecting high availability (the more concentrated the traffic, the more users a single machine fault will affect, and the greater the harm to overall service quality will be), and achieve the purpose of taking into consideration both quality and high availability.

Figure 3:
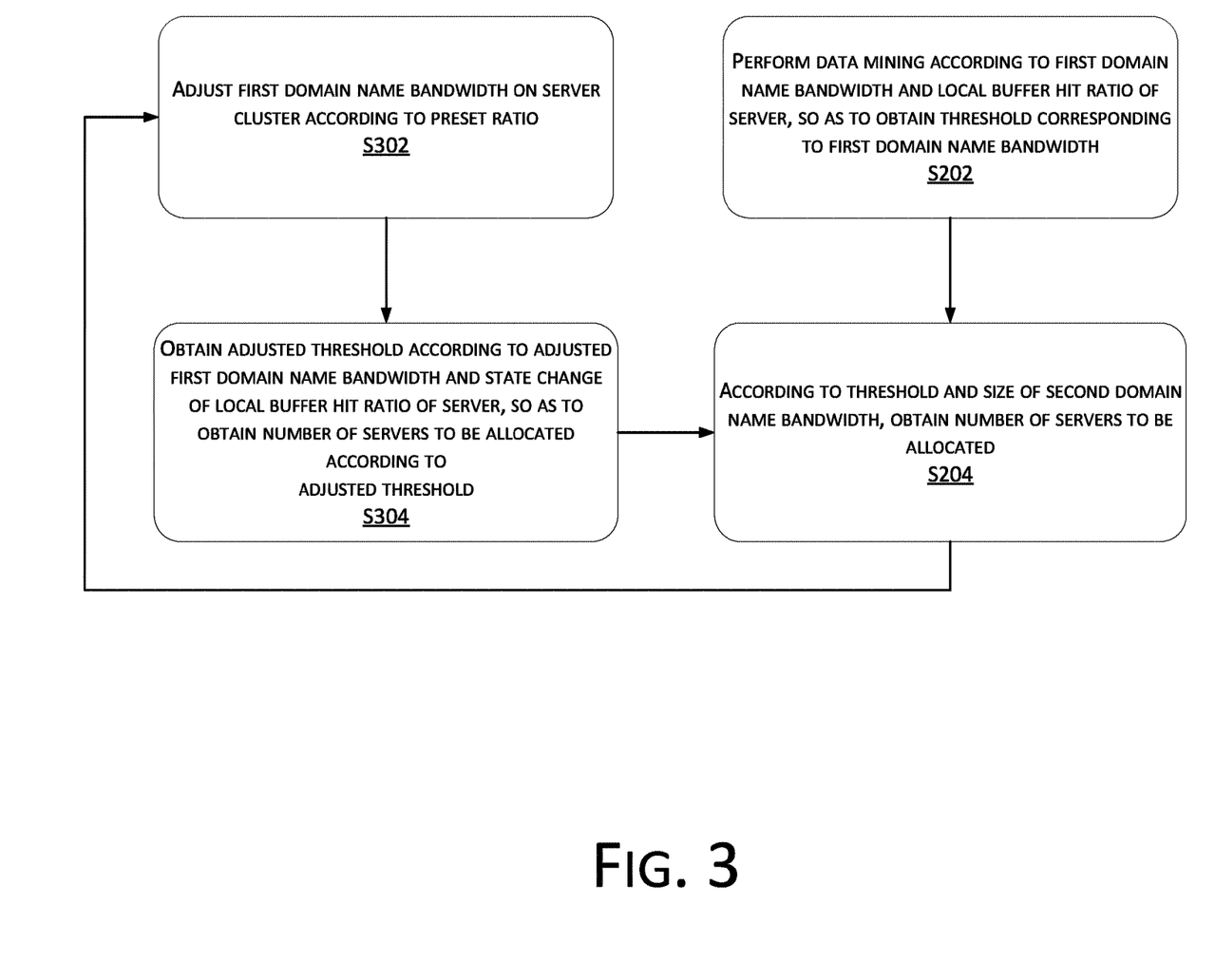
FIG. 3 is a flow chart of an alternative server configuration method according to an embodiment of the present disclosure.

After the number of servers to be allocated is obtained, in order to raise the threshold obtaining accuracy, FIG. 3 is a flow chart of an alternative server configuration method according to an embodiment of the present disclosure. As shown in FIG. 3, the server configuration method provided by the present disclosure further comprises:

Step S302, adjusting the first domain name bandwidth on a server cluster according to a preset ratio;

At the foregoing step S302 of the present disclosure, the number of servers to be allocated is obtained based on step S204. After the step S204, in order to raise the threshold obtaining accuracy, the threshold is further mined, i.e., at step S302, the first domain name bandwidth is adjusted according to a preset ratio.

For example, step S302, adjusting the first domain name bandwidth on a server cluster according to a preset ratio comprises: scaling up or down the first domain name bandwidth on the server cluster according to the preset ratio.

For example, it is assumed that the preset ratio is 20% and the first domain name bandwidth is X, so X is adjusted at a floating ratio of 20%.

Step S304, obtaining an adjusted threshold according to the adjusted first domain name bandwidth and the state change of the local buffer hit ratio of the server, so as to obtain the number of servers to be allocated according to the adjusted threshold.

At the foregoing step S304 of the present disclosure, based on the adjusted first domain name bandwidth and the state change of the local buffer hit ratio of the server, an adjusted threshold is obtained, that is, the first domain name bandwidth is scaled up or down according to a preset ratio, the state change of the local buffer hit ratio of the corresponding server is observed, and an adjusted threshold is obtained according to the threshold obtaining principle at step S202, so that after an adjusted threshold is obtained in the process of the second configuration of the number of servers, the number of servers to be allocated configured according to the adjusted threshold is obtained at step S204.

Here, the bandwidth of a certain domain name is intentionally scaled up or down on a small portion of machines to create conditions for mining the threshold, i.e., for better data mining, thereby determining a threshold and raising the threshold obtaining accuracy.

The small portion of machines in the present disclosure are randomly selected from a total server cluster, and scaling up means a value larger than the first domain name bandwidth in the process of obtaining a threshold at step S202 is used to observe if the local buffer hit ratio of the server increases; or, scaling down means a value smaller than the first domain name bandwidth in the process of obtaining a threshold at step S202 is used to observe if the local buffer hit ratio of the server decreases, so as to determine a threshold dynamically according to the state change of the local buffer hit ratio of the server.

In an embodiment of the present disclosure, a threshold is obtained based on the relationship between a domain name bandwidth and a local buffer hit ratio of a server, and mining is performed according to a first domain name bandwidth and the local buffer hit ratio of the server, so as to obtain a threshold corresponding to the first domain name bandwidth; and according to the threshold and the size of a second domain name bandwidth, the number of servers to be allocated is obtained to achieve the purpose of alleviating the pressure of manual operation and maintenance, so as to achieve a technical effect of raising configuration accuracy, thereby solving the technical problem in the conventional techniques that the configuration of the number of servers for a domain name in a region needs to be adjusted on the basis of experiences or manually in real time according to actual situations, resulting in high operation and maintenance costs and unguaranteed configuration accuracy.

For example, at step S202, performing data mining according to a first domain name bandwidth and a local buffer hit ratio of a server, so as to obtain a threshold corresponding to the first domain name bandwidth comprises:

Step a of S202, obtaining a first domain name bandwidth of any domain name from a user access log and obtaining a local buffer hit ratio of a server;

Step b of S202, determining a threshold according to the correspondence between the value change of the first domain name bandwidth and the state change of the local buffer hit ratio of the server.

Here, after the first domain name bandwidth is greater than the threshold, the local buffer hit ratio of the server no longer rises or rises within a preset margin, such as a margin smaller than a margin threshold. The threshold is determined according to this law.

Here, determining a threshold according to the correspondence between the value change of the first domain name bandwidth and the state change of the local buffer hit ratio of the server comprises: according to the value change of the first domain name bandwidth and the state change of the local buffer hit ratio of the server, determining a specific value at which the local buffer hit ratio of the server no longer rises or rises within a preset margin, such as a margin smaller than a margin threshold, under the condition that the value of the first domain name bandwidth is a specific value as a threshold.

Further, for example, at step a of S202, obtaining a first domain name bandwidth of any domain name from a user access log and obtaining a local buffer hit ratio of a server comprises, according to a preset cycle, obtaining a first domain name bandwidth of any domain name from a user access log and obtaining a local buffer hit ratio of a server. For example, the server configuration method provided by the present disclosure not only may obtain a current number of servers to be allocated, but also may obtain a predicted number of servers to be allocated;

Solution 1: Obtain a Current Number of Servers to be Allocated

For example, at step S204, according to the threshold and the size of a second domain name bandwidth, obtaining the number of servers to be allocated comprises obtaining the current number of servers to be allocated according to the current domain name bandwidth and the threshold under the condition that the second domain name bandwidth includes the current domain name bandwidth, which is obtained in real time by a traffic acquisition device.

Here, obtaining the current number of servers to be allocated according to the current domain name bandwidth and the threshold comprises: obtaining the current number of servers to be allocated by dividing the current domain name bandwidth by the threshold.

For example, calculating according to the threshold and the current domain name bandwidth to obtain the current number of servers to be allocated, where calculating according to the threshold and current domain name bandwidth comprises:

The current number of servers to be allocated=current domain name bandwidth/threshold, where the current domain name bandwidth is obtained in real time by a traffic acquisition device. Here, the traffic acquisition device may comprise a routing device.

Solution 2: Obtain a Predicted Number of Servers to be Allocated

For example, at step S204, according to the threshold and the size of a second domain name bandwidth, obtaining the number of servers to be allocated comprises, under the condition that the second domain name bandwidth comprises a predicted value of domain name bandwidth, obtaining a predicted number of servers to be allocated according to the predicted value of domain name bandwidth and the threshold.

Here, obtaining a predicted number of servers to be allocated according to the predicted value of domain name bandwidth and the threshold comprises: obtaining the predicted number of servers to be allocated by dividing the predicted value of domain name bandwidth by the threshold.

For example, calculating according to the threshold and the predicted value of domain name bandwidth to obtain the predicted number of servers to be allocated, where calculating according to the threshold and the predicted value of domain name bandwidth comprises:

The predicted number of servers to be allocated=predicted value of domain name bandwidth/threshold; where the predicted value of domain name bandwidth may be predicted and obtained through machine learning, i.e., a domain name bandwidth to be obtained soon is predicted according to historical data to obtain the predicted value of domain name bandwidth, and the historical data may include domain name bandwidth purchased from a supplier in history.

Further, for example, the server cluster comprises at least one server.

To sum up, in combination with solution 1 and solution 2, the server configuration method provided by the present disclosure achieves dynamic allocation of the number of servers according to the obtained threshold and in combination with the size of current bandwidth or the predicted value of future bandwidth.

In addition, the minimum number of servers is directly used if the value is below the domain name requirement for minimum number of servers.

Figure 4:
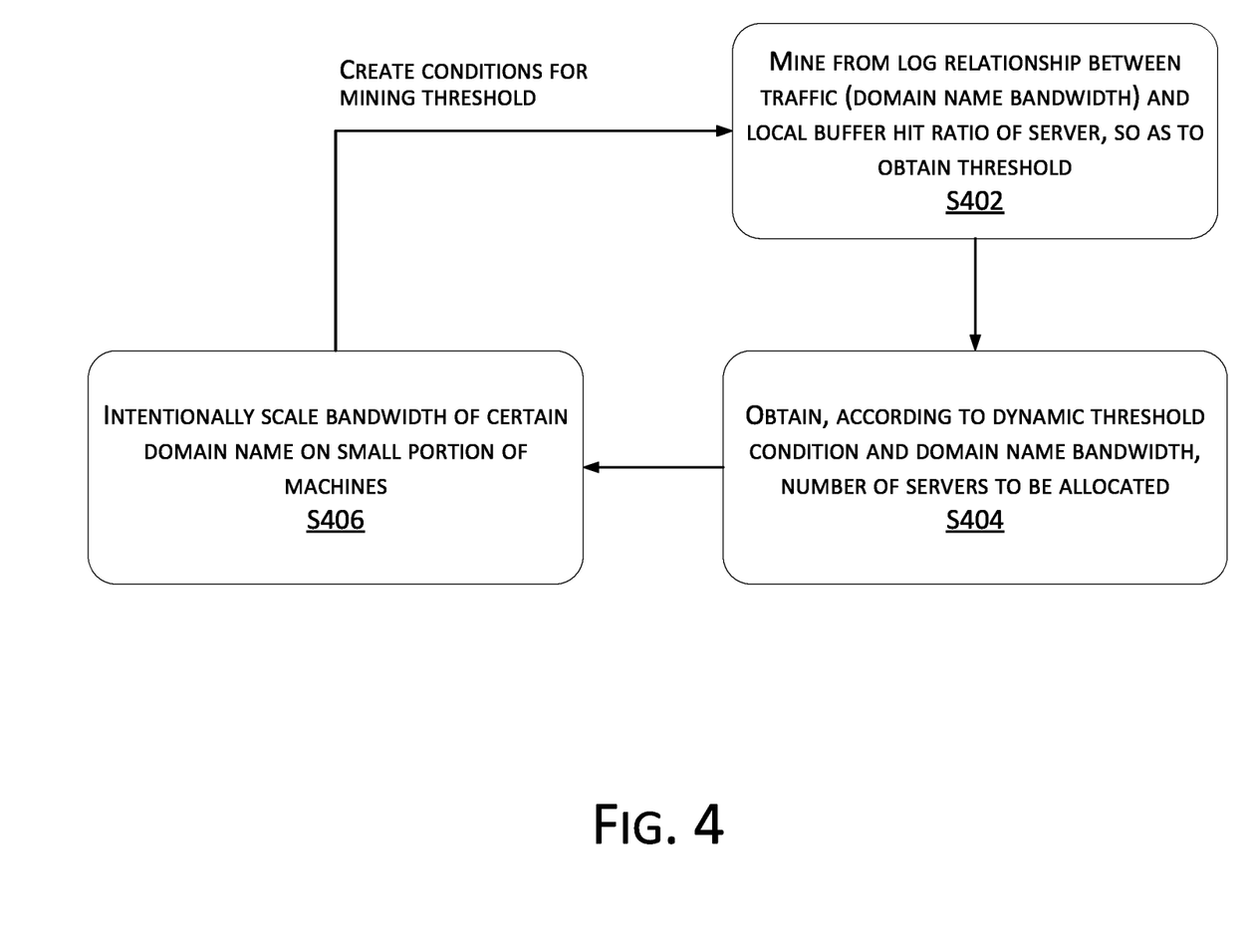
FIG. 4 is a flow chart of an alternative server configuration method according to an embodiment of the present disclosure.

It needs to be noted that through circulation of step S202 to step S304, as shown in FIG. 4, which is a flow chart of an alternative server configuration method according to an embodiment of the present disclosure, i.e., Step 402, mine from a log a relationship between traffic (domain name bandwidth) and a local buffer hit ratio of a server, so as to obtain a threshold;

Step 404, obtain, according to a dynamic threshold condition and the domain name bandwidth, the number of servers to be allocated;

Step 406, intentionally scale the bandwidth of a certain domain name on a small portion of machines, thereby creating threshold mining conditions for step 402.

As shown in FIG. 3, through circulation of step 402 to step 406, the server configuration method provided by the present disclosure may be realized and the purpose of alleviating the pressure of manual operation and maintenance may be achieved, so as to achieve a technical effect of raising configuration accuracy, thereby solving the technical problem in the conventional techniques that the configuration of the number of servers for a domain name in a region needs to be adjusted on the basis of experiences or manually in real time according to actual situations, resulting in high operation and maintenance costs and unguaranteed configuration accuracy.

The server configuration method provided by the present disclosure clarifies the basis for quantification, that is, from the perspective of the relationship between the local buffer hit ratio of the server and the size of the traffic, the size of bandwidth and the number of servers are quantified. For a specific domain name, the system may intelligently decide how many machines should be used in a region, without the follow-up of operation and maintenance personnel, which greatly saves labor costs.

It should be noted that, for the purpose of simple description, the foregoing method embodiments are all expressed as a series of action combinations, but those skilled in the art should know that the present disclosure is not limited by the sequence of actions described because according to the present disclosure, some steps may be performed in other orders or simultaneously. Secondly, those skilled in the art should also know that the embodiments described in the description are example embodiments, and the actions and modules involved may not be necessary for the present disclosure.

Through the description of the foregoing implementation manners, those skilled in the art may clearly understand that the server configuration method according to the foregoing embodiments may be implemented by means of software plus a necessary general hardware platform, of course, it may also be implemented by means of hardware, but in many cases, the former is a better implementation manner. Based on this understanding, the technical solutions of the present disclosure may be embodied in the form of a software product in essence or the part that contributes to the conventional techniques may be embodied in the form of a software product. The computer software product is stored in a storage medium (such as ROM/RAM, disk and CD), and includes several instructions to cause a terminal device (which may be a mobile phone, computer, server, or network device, etc.) to perform the methods described in the embodiments of the present disclosure.

Figure 5:
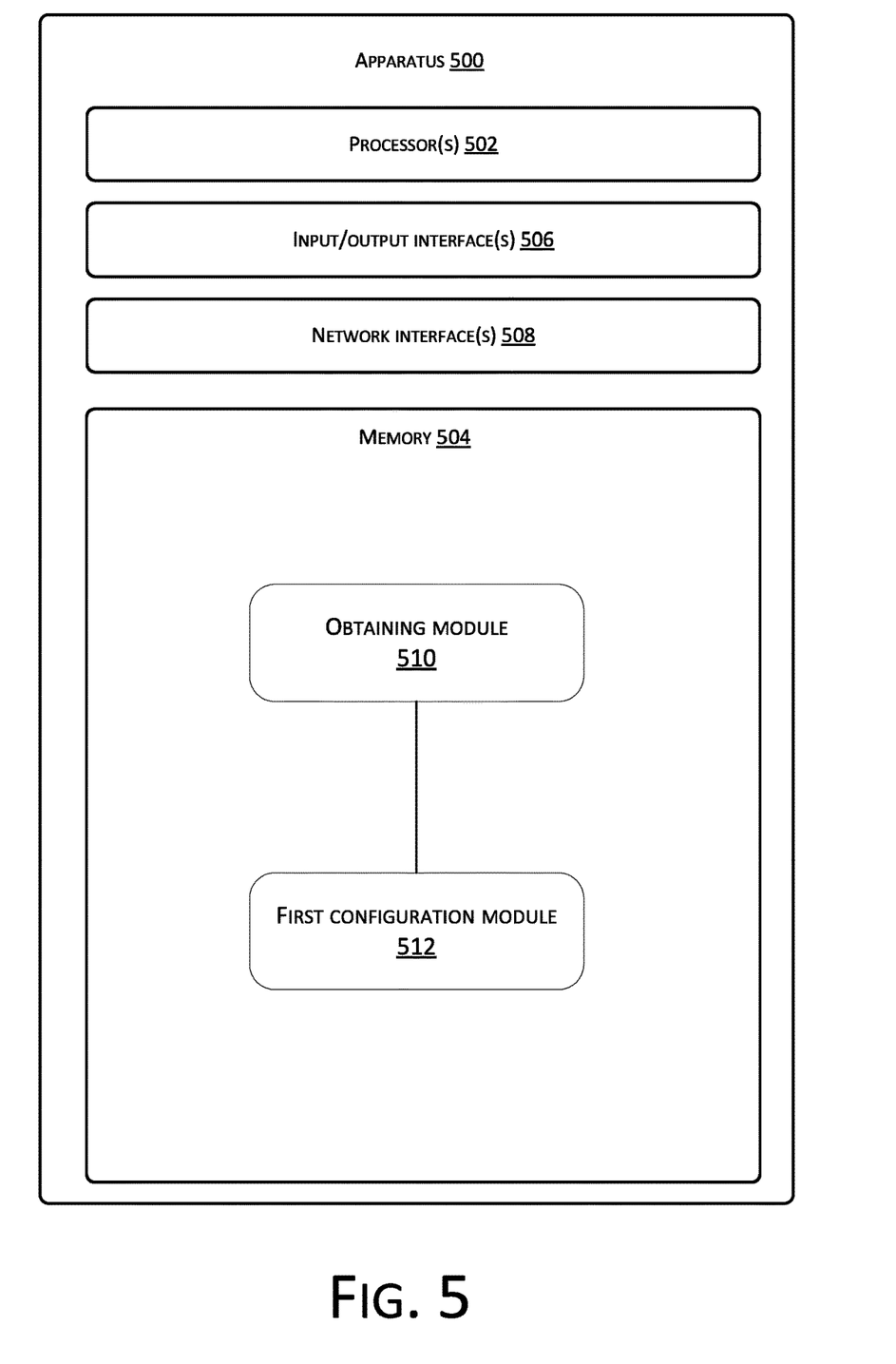
FIG. 5 is a structural diagram of a server configuration apparatus according to an embodiment of the present disclosure.

According to an embodiment of the present disclosure, an apparatus for implementing the foregoing server configuration method is further provided. FIG. 5 is a structural diagram of a server configuration apparatus according to an embodiment of the present disclosure. As shown in FIG. 5, the apparatus 500 includes one or more processor(s) 502 or data processing unit(s) and memory 504. The apparatus 500 may further include one or more input/output interface(s) 506 and one or more network interface(s) 508.

The memory 504 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 504 may store therein a plurality of modules or units including an obtaining module 510 and a first configuration module 512.

Here, the obtaining module 510, for performing data mining according to a first domain name bandwidth and a local buffer hit ratio of a server, so as to obtain a threshold corresponding to the first domain name bandwidth; and the first configuration module 512, for according to the threshold and the size of a second domain name bandwidth, obtaining the number of servers to be allocated.

In an embodiment of the present disclosure, a threshold is obtained based on the relationship between a domain name bandwidth and a local buffer hit ratio of a server, and through the obtaining module, which is for performing data mining according to a first domain name bandwidth and a local buffer hit ratio of a server, so as to obtain a threshold corresponding to the first domain name bandwidth; and the first configuration module, which is for according to the threshold and the size of a second domain name bandwidth, obtaining the number of servers to be allocated to achieve the purpose of alleviating the pressure of manual operation and maintenance, so as to achieve a technical effect of raising configuration accuracy, thereby solving the technical problem in the conventional techniques that the configuration of the number of servers for a domain name in a region needs to be adjusted on the basis of experiences or manually in real time according to actual situations, resulting in high operation and maintenance costs and unguaranteed configuration accuracy.

It needs to be noted that the foregoing obtaining module 510 and first configuration module 512 correspond to step S202 and step S204 in the above method embodiment, and the examples and application scenarios implemented by the two modules and the corresponding steps are the same, but are not limited to the content disclosed in the foregoing method embodiment. It should be noted that the foregoing modules as a part of the apparatus may run in the server provided by an embodiment, which may be implemented by means of software or by means of hardware.

Figure 6:
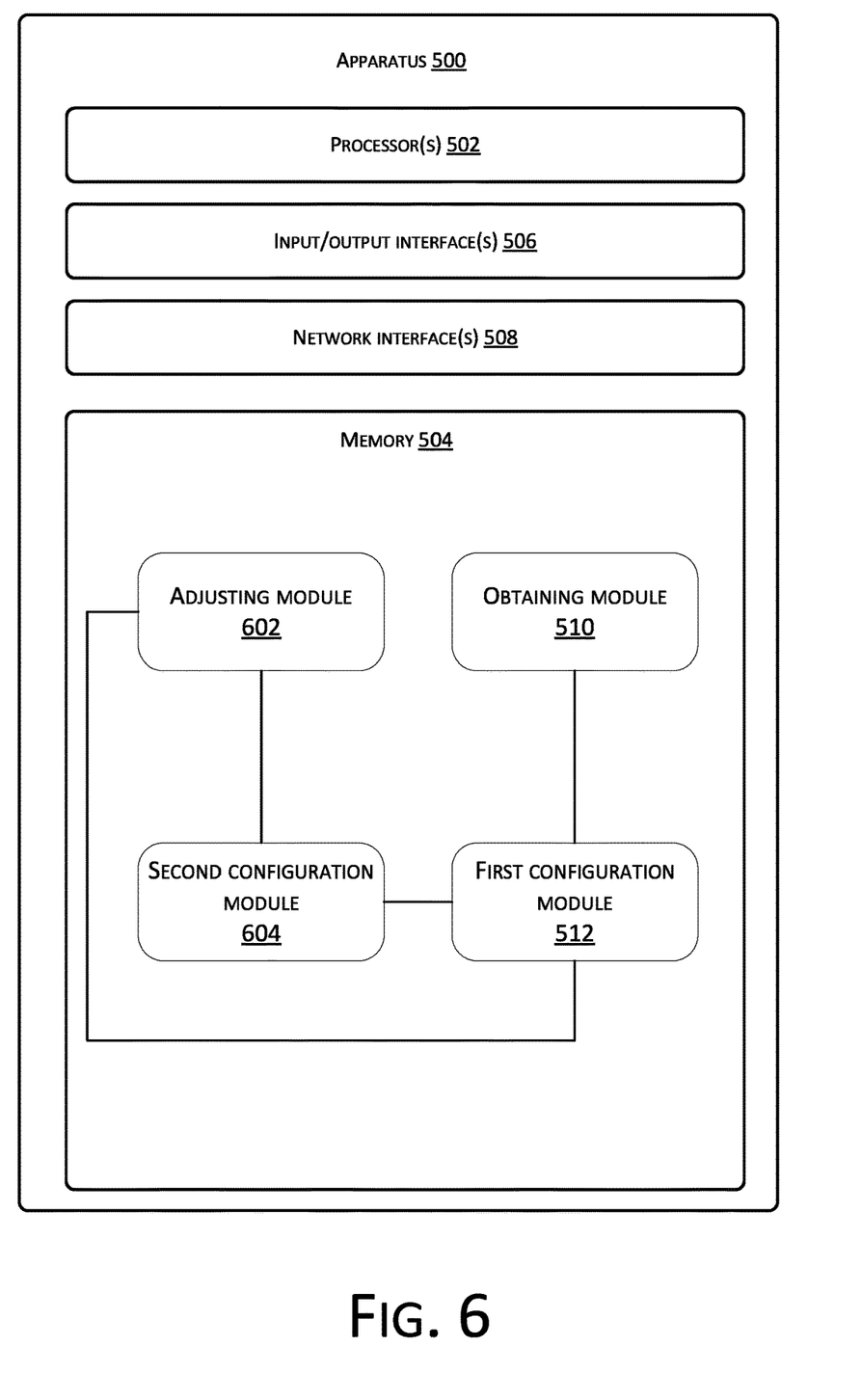
FIG. 6 is a structural diagram of an alternative server configuration apparatus according to an embodiment of the present disclosure.

For example, FIG. 6 is a structural diagram of an alternative server configuration apparatus according to an embodiment of the present disclosure. As shown in FIG. 6, the apparatus 500 further comprises an adjusting module 602 and a second configuration module 604 stored in the memory 504.

Here, the adjusting module 602, for adjusting the first domain name bandwidth on a server cluster according to a preset ratio after the number of servers to be allocated is obtained; and the second configuration module 604, for obtaining an adjusted threshold according to the adjusted first domain name bandwidth and the state change of the local buffer hit ratio of the server, so as to obtain the number of servers to be allocated according to the adjusted threshold.

It needs to be noted that the foregoing adjusting module 602 and second configuration module 604 correspond to step S302 and step S304 in the above method embodiment, and the examples and application scenarios implemented by the two modules and the corresponding steps are the same, but are not limited to the content disclosed in the foregoing method embodiment. It should be noted that the foregoing modules as a part of the apparatus may run the methods in the server according to the method embodiment, which may be implemented by means of software or by means of hardware.

According to an embodiment of the present disclosure, a storage medium is further provided, which includes a stored program, and during operation, the program controls the device where the storage medium is located to execute: performing data mining according to a first domain name bandwidth and a local buffer hit ratio of a server, so as to obtain a threshold corresponding to the first domain name bandwidth; according to the threshold and the size of a second domain name bandwidth, obtaining the number of servers to be allocated; adjusting the first domain name bandwidth on a server cluster according to a preset ratio; and obtaining an adjusted threshold according to the adjusted first domain name bandwidth and the state change of the local buffer hit ratio of the server.

According to an embodiment of the present disclosure, a processor is further provided, which is used to run a program, and during operation, the program executes: performing data mining according to a first domain name bandwidth and a local buffer hit ratio of a server, so as to obtain a threshold corresponding to the first domain name bandwidth; according to the threshold and the size of a second domain name bandwidth, obtaining the number of servers to be allocated; adjusting the first domain name bandwidth on a server cluster according to a preset ratio; and obtaining an adjusted threshold according to the adjusted first domain name bandwidth and the state change of the local buffer hit ratio of the server.

An embodiment of the present disclosure further provides a storage medium. For example, in this embodiment, the foregoing storage medium may be used to save the program code executed by the server configuration method provided by the foregoing method embodiment.

For example, in this embodiment, the foregoing storage medium may be located in any computer terminal of a computer terminal group in the computer network, or in any mobile terminal of a mobile terminal group.

For example, in this embodiment, the storage medium is set to store program codes for executing the following steps: performing data mining according to a first domain name bandwidth and a local buffer hit ratio of a server, so as to obtain a threshold corresponding to the first domain name bandwidth; and according to the threshold and the size of a second domain name bandwidth, obtaining the number of servers to be allocated.

For example, in this embodiment, the storage medium is set to store program codes for executing the following steps: adjusting the first domain name bandwidth on a server cluster according to a preset ratio after the number of servers to be allocated is obtained; and obtaining an adjusted threshold according to the adjusted first domain name bandwidth and the state change of the local buffer hit ratio of the server, so as to obtain the number of servers to be allocated according to the adjusted threshold.

For example, in this embodiment, the storage medium is set to store program codes for executing the following steps: performing data mining according to a first domain name bandwidth and a local buffer hit ratio of a server, so as to obtain a threshold corresponding to the first domain name bandwidth comprises: obtaining a first domain name bandwidth of any domain name from a user access log and obtaining a local buffer hit ratio of a server; and determining a threshold according to the correspondence between the value change of the first domain name bandwidth and the state change of the local buffer hit ratio of the server.

Further, for example, in this embodiment, the storage medium is set to store program codes for executing the following steps: obtaining a first domain name bandwidth of any domain name from a user access log and obtaining a local buffer hit ratio of a server comprises: according to a preset cycle, obtaining a first domain name bandwidth of any domain name from a user access log and obtaining a local buffer hit ratio of a server.

For example, in this embodiment, the storage medium is set to store program codes for executing the following steps: determining a threshold according to the correspondence between the value change of the first domain name bandwidth and the state change of the local buffer hit ratio of the server comprises: according to the value change of the first domain name bandwidth and the state change of the local buffer hit ratio of the server, determining a specific value at which the local buffer hit ratio of the server no longer rises or rises within a preset margin, such as a margin smaller than a margin threshold, under the condition that the value of the first domain name bandwidth is a specific value as a threshold. For example, according to the threshold and the size of a second domain name bandwidth, obtaining the number of servers to be allocated comprises: obtaining the current number of servers to be allocated according to the current domain name bandwidth and the threshold under the condition that the second domain name bandwidth includes the current domain name bandwidth, which is obtained in real time by a traffic acquisition device.

Further, for example, in this embodiment, the storage medium is set to store program codes for executing the following steps: obtaining the current number of servers to be allocated according to the current domain name bandwidth and the threshold comprises: obtaining the current number of servers to be allocated by dividing the current domain name bandwidth by the threshold.

For example, in this embodiment, the storage medium is set to store program codes for executing the following steps: according to the threshold and the size of a second domain name bandwidth, obtaining the number of servers to be allocated comprises: under the condition that the second domain name bandwidth comprises a predicted value of domain name bandwidth, obtaining a predicted number of servers to be allocated according to the predicted value of domain name bandwidth and the threshold.

Further, for example, in this embodiment, the storage medium is set to store program codes for executing the following steps: obtaining a predicted number of servers to be allocated according to the predicted value of domain name bandwidth and the threshold comprises: obtaining the predicted number of servers to be allocated by dividing the predicted value of domain name bandwidth by the threshold.

For example, in this embodiment, the storage medium is set to store program codes for executing the following steps: the first domain name bandwidth includes: a server bandwidth; the second domain name bandwidth includes: a bandwidth purchased from a supplier.

For example, in this embodiment, the storage medium is set to store program codes for executing the following steps: adjusting the first domain name bandwidth on a server cluster according to a preset ratio comprises: scaling up or down the first domain name bandwidth on the server cluster according to the preset ratio.

Further, for example, in this embodiment, the storage medium is set to store program codes for executing the following steps: the server cluster comprises at least one server.

The sequence numbers of the foregoing embodiments of the present disclosure are for the purpose of description only and do not represent the superiority or inferiority of the embodiments.

In the foregoing embodiments of the present disclosure, the description of each embodiment has its own focus. For a part not elaborated in an embodiment, you may refer to relevant descriptions of other embodiments.

It should be understood that the technical content disclosed by the several embodiments provided by the present disclosure may be achieved in other ways. Among them, the apparatus embodiments described above are example only. For example, the division of the units is only a division of logical functions. In actual implementation, there may be other division methods, for example, a plurality of units or components may be combined or integrated to another system, or some features may be ignored, or not implemented. In addition, the displayed or discussed mutual coupling or direct coupling or communication connection may be indirect coupling or communication connection through some interfaces, units or modules, and may be in electrical or other forms.

The units described as separate components may or may not be physically separate, and the components displayed as units may or may not be physical units, i.e., they may be located in the same place, or distributed on a plurality of network units. Some or all of the units may be selected according to the actual need to achieve the objectives of the solution of this embodiment.

Further, the functional units in each embodiment of the present disclosure may be integrated into one processing unit, or each unit may exist alone physically, or two or more units may be integrated into one unit. The foregoing integrated units may be implemented in the form of hardware or in the form of software function unit.

If the integrated unit is implemented in the form of a software functional unit and is sold or used as an independent product, it may be stored in a computer-readable storage medium. Based on this understanding, the technical solutions of the present disclosure may be embodied in the form of a software product in essence or the part that contributes to the conventional techniques or all or part of each technical solution may be embodied in the form of a software product. The computer software product is stored in a storage medium and comprises a number of instructions so that a computing device (it may be a personal computer, a server, a network device, or others) implements all or some of the steps of the method in each embodiment of the present disclosure. The foregoing storage media include various kinds of media that may store program codes, such as USB disk, ROM (Read-Only Memory), RAM (Random Access Memory), mobile hard disk, diskette and compact.

The foregoing description includes only preferred embodiments of the present disclosure. It should be noted that various modifications and improvements may be made by those of ordinary skill in the art without departing from the spirit of the present disclosure, and these modifications and improvements shall be considered falling within the scope of the present disclosure.

The present disclosure may further be understood with clauses as follows.

Clause 1. A server configuration method comprising:

performing data mining according to a first domain name bandwidth and a local buffer hit ratio of a server to obtain a threshold corresponding to the first domain name bandwidth; and obtaining a number of servers to be allocated according to the threshold and a size of a second domain name bandwidth.

Clause 2. The server configuration method according to clause 1, wherein after obtaining the number of servers to be allocated, the method further comprises:

adjusting the first domain name bandwidth on a server cluster according to a preset ratio; and obtaining an adjusted threshold according to the adjusted first domain name bandwidth and a state change of the local buffer hit ratio of the server to obtain a number of servers to be allocated according to the adjusted threshold.

Clause 3. The server configuration method according to clause 1, wherein the performing data mining according to the first domain name bandwidth and the local buffer hit ratio of the server to obtain the threshold corresponding to the first domain name bandwidth comprises:

from a user access log, obtaining the first domain name bandwidth of a domain name and obtaining the local buffer hit ratio of the server; and determining the threshold according to a correspondence between a value change of the first domain name bandwidth and a state change of the local buffer hit ratio of the server.

Clause 4. The server configuration method according to clause 3, wherein the obtaining the first domain name bandwidth of the domain name and obtaining the local buffer hit ratio of the server comprises:

according to a preset cycle, obtaining the first domain name bandwidth of the domain name from the user access log and obtaining the local buffer hit ratio of the server.

Clause 5. The server configuration method according to clause 3, wherein the determining the threshold according to the correspondence between the value change of the first domain name bandwidth and the state change of the local buffer hit ratio of the server comprises:

according to the value change of the first domain name bandwidth and the state change of the local buffer hit ratio of the server, determining a specific value at which the local buffer hit ratio of the server no longer rises or rises within a preset margin, such as a margin smaller than a margin threshold, as the threshold under the condition that the value of the first domain name bandwidth is the specific value.

Clause 6. The server configuration method according to clause 1, wherein according to the threshold and the size of the second domain name bandwidth, the obtaining the number of servers to be allocated comprises:

obtaining a current number of servers to be allocated according to a current domain name bandwidth and the threshold under the condition that the second domain name bandwidth includes the current domain name bandwidth, the current domain name bandwidth being obtained in real time by a traffic acquisition device.

Clause 7. The server configuration method according to clause 6, wherein the obtaining the current number of servers to be allocated according to the current domain name bandwidth and the threshold comprises:

obtaining the current number of servers to be allocated by dividing the current domain name bandwidth by the threshold.

Clause 8. The server configuration method according to clause 1, wherein according to the threshold and the size of the second domain name bandwidth, the obtaining the number of servers to be allocated comprises:

under the condition that the second domain name bandwidth comprises a predicted value of domain name bandwidth, obtaining a predicted number of servers to be allocated according to a predicted value of domain name bandwidth and the threshold.

Clause 9. The server configuration method according to clause 8, wherein the obtaining the predicted number of servers to be allocated according to the predicted value of domain name bandwidth and the threshold comprises:

obtaining the predicted number of servers to be allocated by dividing the predicted value of domain name bandwidth by the threshold.

Clause 10. The server configuration method according to clause 1, wherein:

the first domain name bandwidth includes a server bandwidth; and the second domain name bandwidth includes a bandwidth purchased from a supplier.

Clause 11. The server configuration method according to clause 2, wherein the adjusting the first domain name bandwidth on the server cluster according to the preset ratio comprises:

scaling up or down the first domain name bandwidth on the server cluster according to the preset ratio.

Clause 12. The server configuration method according to clause 11, wherein the server cluster comprises at least one server.

Clause 13. A server configuration apparatus comprising:

an obtaining module for performing data mining according to a first domain name bandwidth and a local buffer hit ratio of a server to obtain a threshold corresponding to the first domain name bandwidth; and a first configuration module for obtaining the number of servers to be allocated according to the threshold and the size of a second domain name bandwidth.

Clause 14. The server configuration apparatus according to clause 13, wherein the server configuration apparatus further comprises:

an adjusting module for adjusting the first domain name bandwidth on a server cluster according to a preset ratio after a number of servers to be allocated is obtained; and a second configuration module for obtaining an adjusted threshold according to an adjusted first domain name bandwidth and a state change of the local buffer hit ratio of the server to obtain the number of servers to be allocated according to the adjusted threshold.

Clause 15. A storage medium, wherein the storage medium includes a stored program, and during operation, the program controls the device where the storage medium is located to execute acts comprising:

performing data mining according to a first domain name bandwidth and a local buffer hit ratio of a server to obtain a threshold corresponding to the first domain name bandwidth; and obtaining the number of servers to be allocated according to a threshold and a size of a second domain name bandwidth.

Clause 16. A processor, wherein the processor is used to run a program, and during operation, the processor executes acts comprising:

performing data mining according to a first domain name bandwidth and a local buffer hit ratio of a server to obtain a threshold corresponding to the first domain name bandwidth; and obtaining the number of servers to be allocated according to a threshold and a size of a second domain name bandwidth.

What is claimed is:

1. A method comprising:
performing data mining according to a first domain name bandwidth and a local buffer hit ratio of a server to obtain a threshold corresponding to the first domain name bandwidth; and
obtaining a number of servers to be allocated according to the threshold and a size of a second domain name bandwidth.

2. The method according to claim 1, wherein after the obtaining the number of servers to be allocated, the method further comprises:
adjusting the first domain name bandwidth on a server cluster according to a preset ratio; and
obtaining an adjusted threshold according to the adjusted first domain name bandwidth and a state change of the local buffer hit ratio of the server to obtain a number of servers to be allocated according to the adjusted threshold.

3. The method according to claim 2, wherein the adjusting the first domain name bandwidth on the server cluster according to the preset ratio comprises:
scaling up or down the first domain name bandwidth on the server cluster according to the preset ratio.

4. The method according to claim 3, wherein the server cluster comprises at least one server.

5. The method according to claim 1, wherein the performing data mining according to the first domain name bandwidth and the local buffer hit ratio of the server to obtain the threshold corresponding to the first domain name bandwidth comprises:
obtaining the first domain name bandwidth of a domain name and the local buffer hit ratio of the server from a user access log; and
determining the threshold according to a correspondence between a value change of the first domain name bandwidth and a state change of the local buffer hit ratio of the server.

6. The method according to claim 5, wherein the obtaining the first domain name bandwidth of the domain name and the local buffer hit ratio of the server from the user access log comprises:
according to a preset cycle, obtaining the first domain name bandwidth of the domain name from the user access log and obtaining the local buffer hit ratio of the server.

7. The method according to claim 5, wherein the determining the threshold according to the correspondence between the value change of the first domain name bandwidth and the state change of the local buffer hit ratio of the server comprises:
according to the value change of the first domain name bandwidth and the state change of the local buffer hit ratio of the server, determining a specific value at which the local buffer hit ratio of the server no longer rises or rises within a preset margin as the threshold.

8. The method according to claim 1, wherein the obtaining the number of servers to be allocated according to the threshold and the size of the second domain name bandwidth comprises:

obtaining a current number of servers to be allocated according to a current domain name bandwidth and the threshold under a condition that the second domain name bandwidth includes the current domain name bandwidth.

9. The method according to claim 8, further comprising obtaining the current domain name bandwidth in real time by a traffic acquisition device.

10. The method according to claim 8, wherein the obtaining the current number of servers to be allocated according to the current domain name bandwidth and the threshold comprises:
obtaining the current number of servers to be allocated by dividing the current domain name bandwidth by the threshold.

11. The method according to claim 1, wherein the obtaining the number of servers to be allocated according to the threshold and the size of the second domain name bandwidth comprises:
under a condition that the second domain name bandwidth comprises a predicted value of domain name bandwidth, obtaining a predicted number of servers to be allocated according to a predicted value of domain name bandwidth and the threshold.

12. The method according to claim 11, wherein the obtaining the predicted number of servers to be allocated according to the predicted value of domain name bandwidth and the threshold comprises:
obtaining the predicted number of servers to be allocated by dividing the predicted value of domain name bandwidth by the threshold.

13. The method according to claim 1, wherein:
the first domain name bandwidth includes a server bandwidth; and
the second domain name bandwidth includes a bandwidth purchased from a supplier.

14. An apparatus comprising:
one or more processors; and
one or more memories storing thereon computer-readable instructions that, when executed by the one or more processors, cause the one or more processors to perform acts comprising:
performing data mining according to a first domain name bandwidth and a local buffer hit ratio of a server to obtain a threshold corresponding to the first domain name bandwidth; and
obtaining a number of servers to be allocated according to the threshold and a size of a second domain name bandwidth.

15. The apparatus according to claim 14, wherein after the obtaining the number of servers to be allocated, the acts further comprise:
adjusting the first domain name bandwidth on a server cluster according to a preset ratio; and
obtaining an adjusted threshold according to the adjusted first domain name bandwidth and a state change of the local buffer hit ratio of the server to obtain a number of servers to be allocated according to the adjusted threshold.

16. The apparatus according to claim 15, wherein the adjusting the first domain name bandwidth on the server cluster according to the preset ratio comprises:
scaling up or down the first domain name bandwidth on the server cluster according to the preset ratio, the server cluster comprising at least one server.

17. The apparatus according to claim 14, wherein the performing data mining according to the first domain name bandwidth and the local buffer hit ratio of the server to obtain the threshold corresponding to the first domain name bandwidth comprises:

obtaining the first domain name bandwidth of a domain name and the local buffer hit ratio of the server from a user access log; and     determining the threshold according to a correspondence between a value change of the first domain name bandwidth and a state change of the local buffer hit ratio of the server.

18. The apparatus according to claim 17, wherein the obtaining the first domain name bandwidth of the domain name and the local buffer hit ratio of the server from the user access log comprises:

according to a preset cycle, obtaining the first domain name bandwidth of the domain name from the user access log and obtaining the local buffer hit ratio of the server.

19. The apparatus according to claim 17, wherein the determining the threshold according to the correspondence between the value change of the first domain name bandwidth and the state change of the local buffer hit ratio of the server comprises:

according to the value change of the first domain name bandwidth and the state change of the local buffer hit ratio of the server, determining a specific value at which the local buffer hit ratio of the server no longer rises or rises within a preset margin as the threshold.

20. One or more memories storing thereon computer-readable instructions that, when executed by one or more processors, cause the one or more processors to perform acts comprising:

performing data mining according to a first domain name bandwidth and a local buffer hit ratio of a server to obtain a threshold corresponding to the first domain name bandwidth, the performing including:

obtaining the first domain name bandwidth of a domain name and the local buffer hit ratio of the server from a user access log;

determining the threshold according to a correspondence between a value change of the first domain name bandwidth and a state change of the local buffer hit ratio of the server; and     obtaining a number of servers to be allocated according to the threshold and a size of a second domain name bandwidth.

* * * * *